United States Patent Office 3,308,539
Patented Mar. 14, 1967

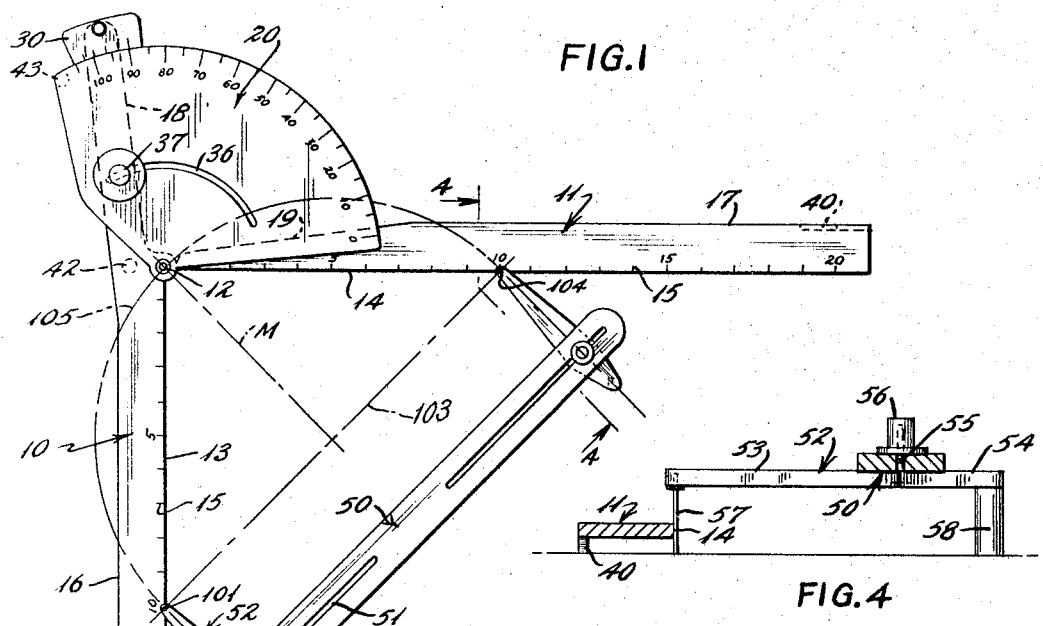

3,308,539
METHOD AND APPARATUS FOR CURVE
PLOTTING
Carl E. Sprouse, 2058 Dellwood Dr.,
Tallahassee, Fla. 32303
Filed June 20, 1966, Ser. No. 558,739
6 Claims. (Cl. 33—27)

This is a continuation-in-part of my application Serial No. 428,123, filed January 26, 1965, now abandoned.

This application relates to pictorial representation and more particularly to the drafting art, especially the plotting of a line of predetermined curvature.

In the making of drawings of highways, bridges and other structures for use by civil engineers and architects, one of the problems has been the plotting of a curve representing the extension of a straight portion of highway or the connecting of two straight portions of a highway or railroad to attain a smooth arc. The degree of curvature is predetermined by a design engineer.

Heretofore, the plotting of such curves has ordinarily been done by use of two procedures In accordance with one procedure the radius point of the curve is determined by mathematical or enginnering means, and a beam compass is mounted at such radius point and used to draw an arc through the two points which are to be connected. However, such procedure is limited to instances in which the radius point is sufficiently close to the arc to be drawn as to permit practical use of a beam compass. Many drawings, however, are to a scale wherein one inch on the drawing represents one hundred feet or even a thousand feet, and in such instances the radius point may be at such great distance as to lie outside the drafting room or the building in which the drafting room is located. In such an instance the use of this procedure could require an excessive area, e.g., the size of a football field, and a beam compass of such massive nature that a tractor would be required to operate it, aside from its inherent inaccuracy. Thus, the use of a beam compass is impractical in many instances.

Another procedure that has been employed in the past is that described in "Field Manual for Railroad Engineers," by J. C. Nagle, page 61, published by J. Wiley & Sons, New York, 3d ed., 1917. Such procedure involves the plotting of a series of points between the points to be connected and selecting appropriate drafting instruments having curves of varying degrees thereon for connecting these points. Such procedure is complex and time-consuming and requires a substantial investment in a set of instruments of graduated curvature. Even with such a method the plotting is subject to inaccuracy, since an infinite number of plotting curves would be required to meet every situation, and the use of a relatively small number represents the selection in most instances of an instrument having a curve which is not precisely that of the actual predetermined arc.

Although instruments of generally similar nature to that under consideration have been known, these have not been adapted for plotting requirements as described herein.

It is an object of the present invention to provide an instrument and a method by which a maximum range of curves of predetermined curvature may be accurately and easily plotted, such instrument and method being appicable to various scales and eliminating the necessity for procedures and apparatus which have heretofore suffered from the disadvantages to which reference has been made.

These and other objects of the invention will be apparent from the following description in conjunction with the accompanying drawing, in which:

FIG. 1 is a plan view of an instrument in accordance with the present invention, illustrating its use in the 90° position;

FIG. 2, a fragmentary plan view to an enlarged scale, and illustrating it in the 0° position;

FIG. 3, an elevation of the portion of the instrument illustrated in FIG. 2;

FIG. 4, a section on the line 4—4 of FIG. 1 to an enlarged scale; and,

FIGS. 5 and 6, section on the lines 5—5 and 6—6, respectively, of FIG. 3.

Briefly stated the present invention includes a pair of pivotally connected arms having a marking instrument at their intersection and having accurately adjustable means for indicating the angle at which the arms are connected and for holding the arms in selected position. Further the invention includes a holder for guide points which is of a nature especially adapted for adjustable use with the pivotally connected arms.

The invention also includes a procedure whereby a draftsman may plot a prescribed curve from a reference line for a desired distance. This comprises setting the arms at the prescribed angle, aligning one of the arms with the reference line, and with the junction of the arms at the point where the curvature is to begin, drawing a construction line along the other arm, locating reference points on the arms at predetermined chord lengths from the junction of the arms, placing the reference point of the first arm on the point of curvature and the reference point of the other arm on the construction line, positioning guide pins at the two points and moving the arms always in contact with the two pins to cause a marking instrucent at their intersection to move through the arc desired. Should it be necessary to extend the arc, this is done by positioning the instrument with its intersection at the end of the arc just plotted, positioning a pin where the reference point on the first arm intersects the curve just drawn, and positioning a second pin opposite the indicia on the leading arm, from which position the instrument may again be moved through a path for extension of the arc.

With further reference to the drawing, the instrument includes first and second arms 10 and 11 which are preferably of substantially equal length and pivotally connected at 12. The arms have inner sides 13, 14 with linear indicia 15 thereon, and outer sides 16, 17. The end portion of arm 10 adjacent to the pivot 12 has an angularly disposed offset portion whose inner side 18 is complementary to the outer side 19 of the corresponding end of the arm 11 such that when the arms are in the 180° position, as indicated in FIG. 2, the sides 18 and 19 engage.

An angle selector plate 20 is connected to and overlies arm 11, the arms 10 and 11 being angularly adjustable in the same plane. A substantially cylindrical post 22 is connected to the arm 10 at the pivot point 12 and extends upwardly through an opening at the apex of the selector plate 20. A chuck assembly 24 is positioned within the bore 25 of the post 22 for holding a scriber 26.

A vernier plate 30 is mounted on the tip of arm 10. The plate has an enlarged bore 31 in order that it may be adjusted for a true zero position. The plate is held by a bolt 32 secured to the arm 10 and threadedly engaged with the knob 33.

Similarly in order to hold the arms in selected angular relationship, a bolt 35 is engaged with the arm 10 and extends upwardly through slot 36 and the selector plate into threaded engagement with knob 37.

Means are provided for raising the various portions of the arm assembly above the surface in order to facilitate accurate plotting with the instrument. This means includes a glide plate 40 having gradually inclined sides 41 mounted beneath the outer ends of the arms 10, 11, preferably at the outer sides, a glide knob 42 beneath the arm 10 adjacent to the pivot point 12, and a glide knob 43 at the left upper corner of the selector plate 20 as viewed in FIGS. 1 and 2. It will be understood that the scribing point 26 is adjusted to have appropriate contact with the paper in view of the raised position of the assembly as caused by the members described.

An important part of the invention is the means by which the arm assembly, which has been described, may be moved through a desired arc. This is essentially a device for facilitating the adjustment and holding of a pair of chord point pins at a selected position. The chord point pin holder comprises a main elongated relatively rigid body 50 having longitudinal slots 51 extending from adjacent the center to adjacent its ends, the body member of a length somewhat approximating that of the arms 10 or 11. A cross arm 52 is mounted for adjustment in each of the slots. The cross arms have a relatively long forward portion 53 and a shorter rearward portion 54. The cross arms are mounted as indicated in FIG. 4 by a bolt 55 secured thereto and extending through the slot 51 into threaded engagement with a knob 56, the arrangement permitting angular and longitudinal adjustment of the arms 52, 53 with respect to the member 50.

At their forward ends each of the arms has a downwardly depending pin 57 and at their rearward ends a downwardly depending spacer or foot 58, in order that the cross arms 52, 53 and the member 50 may be supported substantially horizontally and resist displacement, by the application of light manual pressure on the body 50.

Because of the construction of the chord point pin holder, the assembly is easily adjustable through a wide range of chord lengths, is easy to use and to hold in place as the angle arm assembly is moved with respect thereto, and yet of simple construction.

Due to the arrangement of the angle selector plate 20 and the arms 10, 11, the assembly may be moved through a complete angle from zero to 90°, including using the vernier plate 30, without having a portion of the selector plate protrude over into the area of the inner sides of the arms. This permits full use of the instrument through the maximum angular range without interference with the drawing of a chord describing an arc at any angle throughout such range.

In the use of the device, assume that in FIG. 1 the point 101 (adjacent arm 10) represents the end of line 102 from which a line 105 is to be plotted in accordance with this invention. Assume further that we are instructed that such plotted line is to have a curvature of 90°. The arms 10, 11 are thereupon adjusted accordingly. The instrument is then placed with the scriber 26 at the end of point 101 of line 102 and with the inner edge of the arm 10 along the line 102. A construction line 103, at least 200 feet to scale, is then drawn along the inner side of the arm 11. A point is then marked or located on the inner sides of the arms 10, 11 opposite the 100 foot marks from the scriber 26. The guide pin 57 of cross arm 52 is then set at point 101. The instrument is then moved so that the 100 foot indicia on arm 10 is directly next to the pin at 101 and with the 100 foot indicia on arm 11 intersecting the construction line previously drawn. At such intersection 104 the other pin 57 is positioned. Using the pins as locators, the instrument is then moved with each arm constantly in contact with its respective pin during which the scriber 26 moves through the arc 105 therebetween, as indicated in FIG. 1.

Alternative procedures for plotting the curve are apparent. In one method using the degree of curve with chord and deflection ratio the following are the steps:

Set the protractor arms to one-half the degree of curvature. Align arm 10 at a tangent with line 102 and with the scriber 26 at point 101. Indicate central point 12 at the 100 foot mark on arm 11. Reset arms of the protractor to the full curvature angle. Position the instrument with the scribing point 26 at position 12 and with the inner edge of arm 10 intersecting point 101 and indicate point 104 at the 100 foot distance on arm 11. The instrument is now in plotting position.

Another procedure, using the long chord and mid-ordinate, is as follows:

Set the arms of the instrument at the total curvature. Align arm 101 with line 102 and position the plotting point at point 101. Indicate the point on arm 11 which corresponds to the long chord distance, obtained from tables available in this art. Position the plotting point at point 12, corresponding to the termination of the mid-ordinate M, the latter available from the tables. Set the chord point pins at the points 101 and 104. The instrument is in plotting position.

If it is necessary to extend the arc beyond that described, this is accomplished as follows: The scriber 26 is located at the end of the arc corresponding to point 104 and at the point where the 100 foot indicia on arm 10 intersects the curve previously drawn, pin 57 on cross arm 52 is positioned. With the instrument thus located the pin 57 on arm 53 is set opposite the 100 foot chord of the arm 11. The instrument is then moved with respective arms in constant contact with their respective pins so that the scriber 26 will move through a continuation of the arc previously drawn. The procedure may be repeated to extend the arc as far as desired.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A drafting instrument for plotting an arc between two points,
    said instrument comprising first and second pivotally connected arms of substantially equal length,
    said arms having inner and outer sides and said first arm having a guiding edge along the inner side of its major portion which is straight and free of obstruction,
    a zero indicia mounted at the end of said first arm,
    said second arm having an angle selector plate mounted thereon and in a plane above said arm,
    said second arm having an inner side which is straight and free of obstruction,
    said angle selector plate extending over into said second arm and overlying said first arm whereby said arms are in the same plane,
    said plate extending through more than 90 angular degrees,
    means for holding the arms in a selected angular position,
    means for adjustably holding a scribing point at the intersection of said arms,
    and a chord point pin holder,
    said chord point pin holder comprising a substantially rigid main elongated body member,
    said body member of a length approximating one of said arms,
    a cross arm for each end portion of said pin holder,
    said cross arms each having means permitting angular and longitudinal adjustment of the cross arm with respect to the pin holder,
    the cross arms having a forward portion and a pin fixed therein and extending downwardly therefrom and a rearward portion and a post fixed thereto and extending downwardly therefrom,
    the pin and the post being of substantially equal length and substantially parallel in order to support the cross arm horizontally above a surface,
    and means for fastening the cross arms to the pin holder in selected position.

2. The invention of claim 1, and a post extending upwardly from the inner edge of said first arm substantially at an end of its straight portion, and said selector plate having a portion extending beyond the end of said second arm and having a bore therethrough for mounting on the post of said first arm, said post having a bore.

3. The invention of claim 1, said first arm having an extension with an angularly disposed portion, said zero indicia mounted at the end of said angularly disposed portion of said first arm, the outer side of the end portion of said second arm being angularly disposed and adapted to engage the outer side of the end portion of said first arm with the inner sides of the two arms in a straight line.

4. The invention of claim 1, said body member having longitudinal slot means extending from adjacent each of its ends to adjacent its center, said cross arms adjustment means comprising mounting means extending through the slot means in said body member.

5. The invention of claim 1, in which the zero indicia of the first arm includes a vernier scale.

6. The invention of claim 1, in which said first and second arms have projections extending beneath their ends for raising the arms above a working surface,
   said projections having a base attached to the arms and an outwardly protruding portion which is of gradual incline in order that it may be drawn over low obstruction without catching, and
   said angle selector plate and said end portion of said first arm having downwardly projecting knobs for raising the central portion of the device above the drawing surface.

References Cited by the Examiner
FOREIGN PATENTS

| | | |
|---|---|---|
| 603,296 | 1/1926 | France. |
| 452,329 | 10/1949 | Italy. |
| 84,778 | 8/1920 | Switzerland. |
| 246,488 | 9/1947 | Switzerland. |

LEONARD FORMAN, *Primary Examiner.*

H. N. HAROIAN, *Assistant Examiner.*